United States Patent
Lee

(10) Patent No.: US 7,685,623 B2
(45) Date of Patent: Mar. 23, 2010

(54) AUDIO/VIDEO SIGNAL DISTRIBUTION SYSTEM

(75) Inventor: Henri Lee, Villiers sur Morin (FR)

(73) Assignee: Casanova, Champ sur Marne (FR)

( * ) Notice: Subject to any disclaimer, the term of this patent is extended or adjusted under 35 U.S.C. 154(b) by 1009 days.

(21) Appl. No.: 10/529,153

(22) PCT Filed: Sep. 24, 2002

(86) PCT No.: PCT/FR02/03260

§ 371 (c)(1),
(2), (4) Date: Jan. 9, 2006

(87) PCT Pub. No.: WO03/028370

PCT Pub. Date: Apr. 3, 2003

(65) Prior Publication Data

US 2006/0139489 A1    Jun. 29, 2006

(30) Foreign Application Priority Data

Sep. 25, 2001   (FR) .................................. 01 12533

(51) Int. Cl.
*H04N 7/13* (2006.01)
(52) U.S. Cl. ..................... 725/80; 725/78; 725/79; 725/81; 725/82; 725/83; 725/84; 725/85
(58) Field of Classification Search .............. 725/78–85
See application file for complete search history.

(56) References Cited

U.S. PATENT DOCUMENTS

| | | | | | |
|---|---|---|---|---|---|
| 5,537,142 | A | * | 7/1996 | Fenouil | 725/105 |
| 5,541,586 | A | * | 7/1996 | Wise | 340/2.2 |
| 5,598,406 | A | * | 1/1997 | Albrecht et al. | 370/296 |
| 5,815,505 | A | * | 9/1998 | Mills | 370/522 |
| 5,983,070 | A | * | 11/1999 | Georges et al. | 725/78 |
| 6,192,399 | B1 | * | 2/2001 | Goodman | 725/78 |
| 6,240,554 | B1 | * | 5/2001 | Fenouil | 725/105 |
| 6,328,480 | B1 | * | 12/2001 | Strike | 385/75 |
| 6,567,981 | B1 | * | 5/2003 | Jeffrey | 725/80 |
| 6,618,774 | B1 | * | 9/2003 | Dickens et al. | 710/64 |
| 7,002,925 | B2 | * | 2/2006 | Richardson | 370/254 |
| 2005/0251827 | A1 | * | 11/2005 | Ellis et al. | 725/47 |

FOREIGN PATENT DOCUMENTS

| | | |
|---|---|---|
| GB | 2 296 169 A | 6/1996 |
| GB | 2 359 429 A | 8/2001 |
| WO | WO 0167757 A | 9/2001 |

* cited by examiner

Primary Examiner—Jason P Salce
(74) Attorney, Agent, or Firm—Sughrue Mion, PLLC

(57) ABSTRACT

The invention concerns an audio/video signal distribution system, comprising audio/video signal sources (MGT, DVD, C, HIFI) and audio/video signal receivers (TV1, TV2, TV3, TV4), and a central processing and multiplexing unit (MDS, MDS'). The invention is characterized in that it comprises a twisted pair service network (PS) for routing said audio/video signals from the sources to the processing and multiplexing unit and a twisted pair distribution network (P, D) for routing the processed multiplexed audio/video signals from the processing and multiplexing unit to the receivers.

25 Claims, 4 Drawing Sheets

AUDIO/VIDEO SIGNAL DISTRIBUTION SYSTEM

Figure 1:
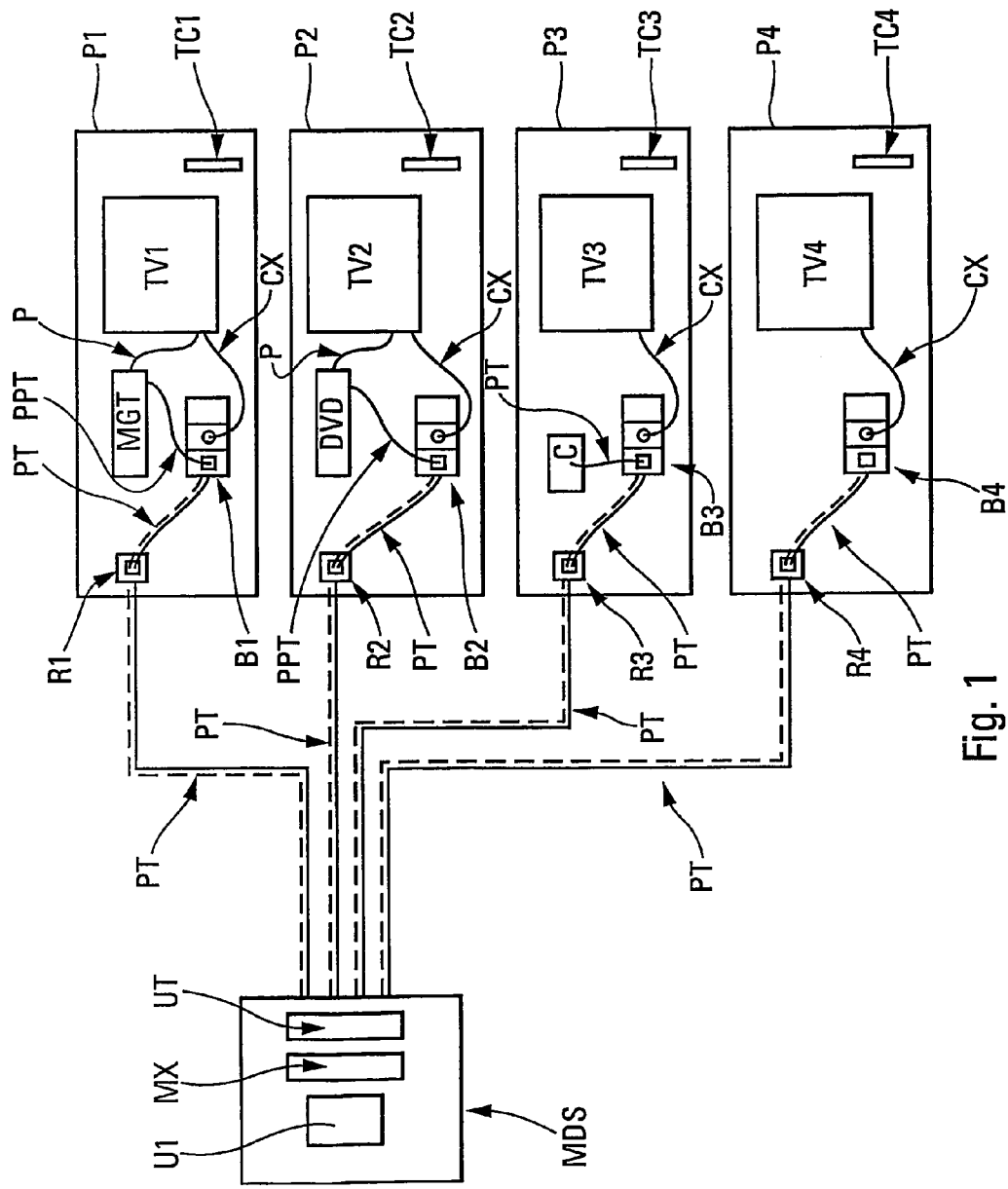

This invention relates to an audio/video and/or TV signal transmission or distribution system intended for production of images or sound on a TV, audio and/or video receiver.

At the moment, there are many sources of audio/video signals that can be classified into two categories, namely internal sources such as VCRs, DVD players, cameras, HIFI systems etc., and external sources such as radio antennas or satellite dishes, satellite terminals, etc. This invention concerns firstly the distribution of video signals output from internal sources, and then with video signals output from external sources.

The user now has many signal sources that at the moment are dedicated to a single receiver, while it is more and more frequent to have several receivers in the same home. It is no longer surprising that a single family has up to four to six TV receivers. However, due to the fact that signal sources are usually dedicated to a single receiver, other receivers cannot benefit from these various sources. For many years, it has been known that a splitter as described below and an amplifier can be used to multiplex TV signals output from a radio antenna or a satellite dish. The length of the wiring between the antenna and the TV receivers is then limited and is done using coaxial cables. However, apart from these external sources, there are other external sources in the form of satellite terminals and internal sources like those mentioned above. For these other sources, it is difficult to find an easy way of transferring the signals as far as the different TV receivers. In the past, if a person wanted to use the family's VCRs on his own TV receiver, he would have disconnected it from the receiver on which it was initially installed and then connected it to his own TV receiver. The same applies for other internal sources such as the DVD player or cameras.

Secondly, in the domain of connections and home automation, it is very frequent to use cables consisting of twisted wire pairs for wiring or pre-wiring of a building or a home. This cable is used for the transmission of very low voltage signals for a wide variety of uses including telephony, data processing, automation, alarm, sound system, etc. Homes are more and more frequently pre-wired with a pre-cabled low current network using this type of cable of twisted wire pairs. We will often refer to twisted pair networks in the remainder of this text.

The purpose of the transmission system according to this invention is to use an existing twisted pairs network for the transmission of audio and/or video signals output from internal sources, or from external sources.

To achieve this purpose while overcoming the disadvantages mentioned above according to prior art, this invention proposes a system for distribution of audio/video signals comprising audio/video signal sources and audio/video signal receivers, and a central processing and multiplexing unit, characterised in that it comprises a twisted pairs service network for routing audio/video signals derived from sources to the central processing and multiplexing unit and a twisted pairs distribution network to carry the processed and multiplexed audio/video signals output from the processing and multiplexing unit to the receivers. Therefore, two separate twisted pair networks are used firstly to send signals output from sources to the central processing and multiplexing unit on a network, and secondly to carry multiplexed processed signals down to receivers on the other network.

Advantageously, the system includes means of inputting control signals that can be routed on the control signals network.

Advantageously, the system includes connection means to which signal sources can be connected to send audio/video signals and to receive control signals on the service network.

Advantageously, the system includes input modulators associated with the connection means to modulate signals to be routed on the service network.

Advantageously, the system includes coaxial cable on which a coaxial cable leading to a TV receiver can be connected.

Advantageously, the system includes adapters associated with coaxial terminals to adapt a processed signal output from the distribution network to be routed on a coaxial cable.

Advantageously, the central unit includes multiplexing means to multiplex control signals on the service network and to multiplex the modulated audio/video signals on the distribution network.

Advantageously, the central unit includes a processing unit to process the multiplexed modulated signals output from the service network to route them on the distribution network.

With this system, any source can be controlled by sending a control signal to it from control signal input means. The control signal thus input into the system is transferred using the service twisted pairs network as far as the central processing and multiplexing unit that multiplexes it on the complete service network. The control signal does not need any special processing before being multiplexed. As soon as the searched source has received and recognised the control signal, it sends an audio/video signal in response that is processed at its associated input modulator so that it can be sent on the service twisted pairs network as far as the central processing and multiplexing unit, which after multiplexing and processing, sends it onto the entire distribution network and to the output modulator with which the coaxial terminal of the selected TV receiver is associated, and connected using a coaxial cable. This thus completes the system. The advantage of this distribution or transmission system is in the use of two previously installed twisted pair networks, in which the twisted pairs are used to route the control signals and the modulated video signals on one network and to send the multiplexed processed signals on the other network. Thus, the central processing and multiplexing unit forms a network node connected to a previously installed network of cables consisting of twisted wire pairs.

Advantageously, the system includes processing means for individually processing the modulated signals output from the service network before routing them to multiplexing means.

Advantageously, the multiplexing means multiplex the control signals output from the service network to reinject them onto the service network.

Advantageously, the control signals input means include a wave receiver associated with a remote control.

According to one practical embodiment, the system includes boxes integrating the input modulators associated with connection means corresponding to them to modulate signals output from sources, output adapters associated with corresponding coaxial terminals to adapt the signal output from the distribution network, means of inputting control signals that can be routed on the service network, connection means onto which the signal sources can be connected to send audio/video signals and to receive control signals on the service network, coaxial cable terminals to which a coaxial cable connecting to a receiver can be connected, and means of connection to the distribution network and the service network. Advantageously, the distribution network and the service network are formed from a single previously installed network of cables consisting of twisted wire pairs. This audio/ video signal transmission system can thus be summarised as a set of boxes and a central unit integrating the processing and multiplexing means. Each box is associated with a specific receiver while the central unit is common to all boxes. Each box is connected to a network terminal comprising previously installed or pre-wired cables consisting of twisted wire pairs, and the central unit is connected to the other end of the network in the equipment room. Each box is thus connected to the existing twisted pairs network using a connection cable consisting of twisted wire pairs, but it is also connected to the receiver using a classical connection cable and to the signal source using a specific cable that may be of several types such as a SCART/RJ45 type, or a RJ45/RJ45 type.

However, the audio/video signal transmission system according to the invention can also use other signal sources. For example, multiplexing means may also be connected to external audio/video signal sources processed later in the processing unit so that they can be transferred onto the distribution network. Advantageously, the external sources include antennas and/or satellite terminals. Thus, similarly, a control signal can be entered into the service network as far as the multiplexing means that will multiplex the control signal on the entire service network. In return, the external source outputs a video or audio signal that is firstly multiplexed and is then processed in the processing unit so that it can then be routed on the distribution network as far as the output adapter with which the coaxial cable terminal is associated, and connected to the receiver using a conventional coaxial connection cable. In practice, the system can thus be summarised as a set of boxes as defined above and a central multi-distribution unit. The central unit is thus connected to the previously installed twisted pairs network that acts as branch connections to reach the boxes that are installed close to a low current terminal installed in the room in which the dedicated receiver is located.

The invention will now be described in more detail with reference to the appended figures given as non-limitative examples of two embodiments of the invention.

Figure 2:
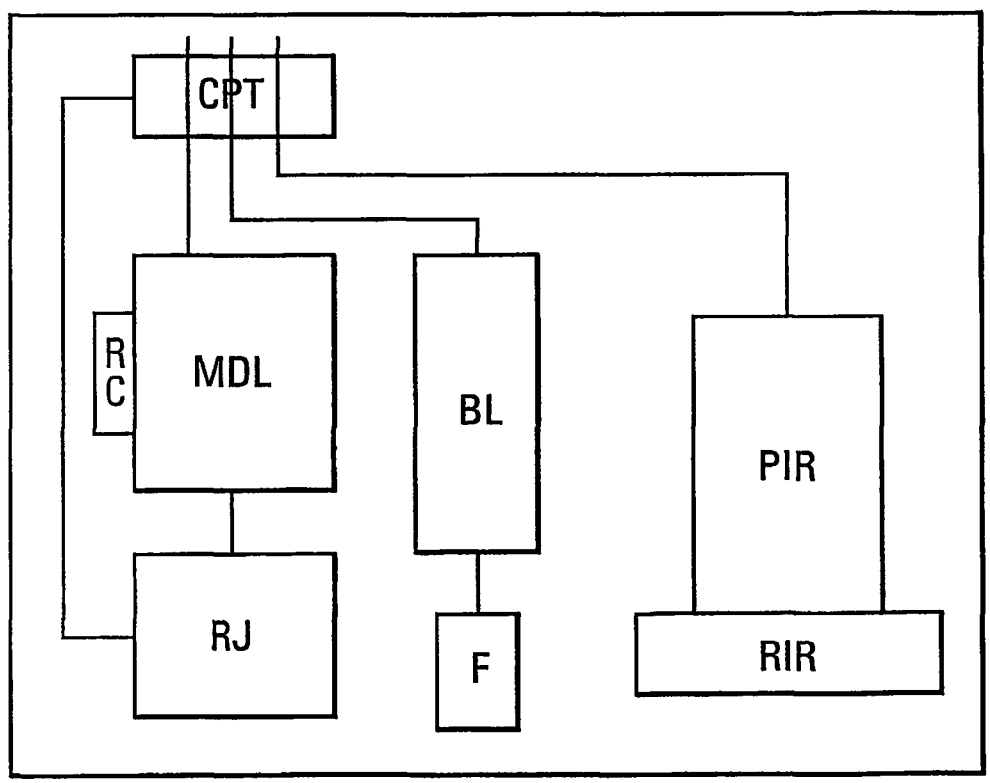
Figure 3:
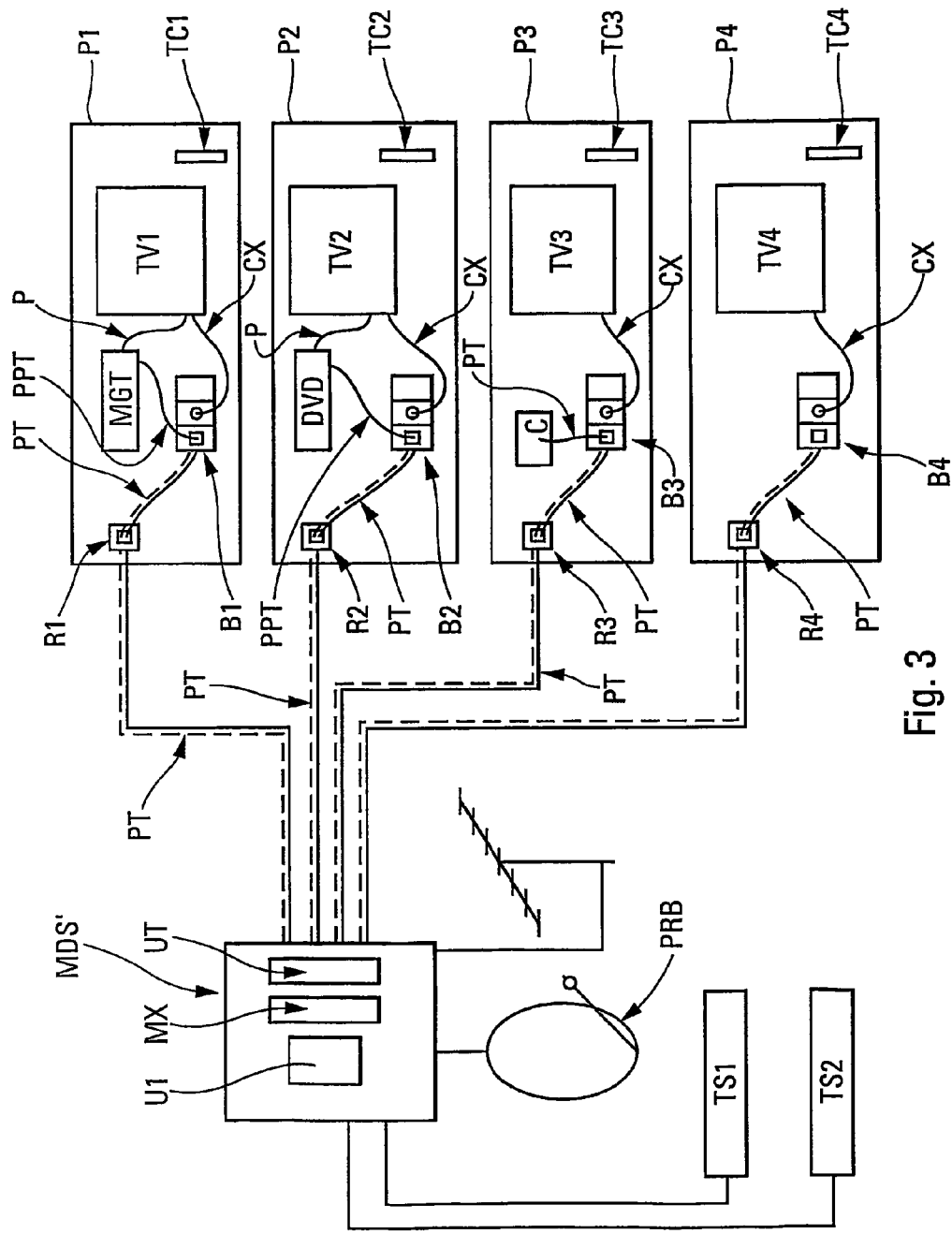
Figure 4:
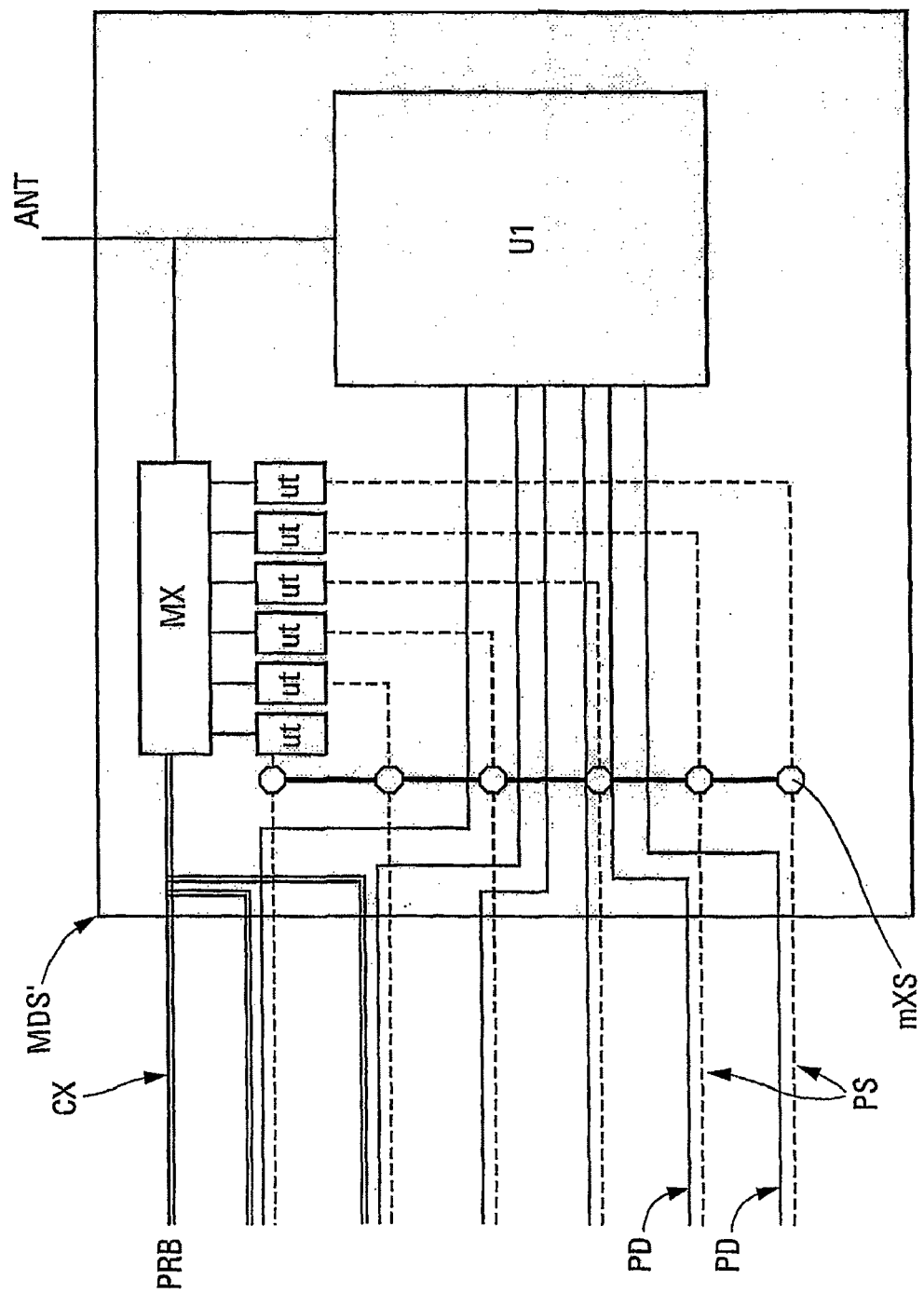

In the figures:

FIG. 1 is a diagram illustrating use of a transmission system according to the invention in premises or a home composed of four rooms each equipped with a TV receiver, FIG. 2 is a diagram of the box used in this invention, FIG. 3 is another diagram showing the transmission system according to the invention in an application using external video signal sources, and, FIG. 4 is a diagram showing the structure of the central multi-distribution unit.

Refer firstly to FIG. 1 that illustrates an application of the transmission system according to the invention in a home or an office with four rooms reference P1 to P4. This case applies particularly to a home, in which room P1 could be the living room, and rooms P2, P3 and P4 could for example be bedrooms. This home has a network of cables consisting of twisted wire pairs PT extending into each room P1 to P4. In FIG. 1, this prewired or previously installed network is composed of cables consisting of twisted wire pairs PT located outside the rooms P1 and P4 and going inside the rooms at terminals R1 to R4, which for example may be in the form of RJ45 type terminals. Twisted pair cables PT arrive at the other end of the terminals R1 to R4, for example in an equipment room (not shown).

Conventionally, one cable consisting of twisted wire pairs is composed of four twisted wire pairs. This invention only uses two pairs of wires, namely one pair called the "service" pair for carrying control signals and returning audio/video signals, and another pair called the "distribution" pair to route down audio/video signals.

We will now describe the contents of rooms P1 to P4. Each room is equipped with a TV receiver reference TV1 to TV4 used with a remote control TC1 to TC4, which for example may be of the infrared emission type. Audio receivers such as HIFI systems could also be used.

Each room is also equipped with a box B1 to B4, the details of which are shown in FIG. 2.

Boxes B1 to B4 may be identical. Each box has an RJ45 type low current terminal on the facade, a coaxial terminal F and a wave receiver RIR, for example of the infrared type. The box comprises connection means CPT, for example on the back face, to connect a cable consisting of twisted wire pairs PT. The RJ terminal is connected to the CPT connection means using a modulator MDL. The coaxial terminal F is connected to the connector CPT using a device for example such as a balun for matching or creating symmetry. The receiver RIR is connected to the connector CPT through a wave processing unit PIR. The modulator MDL is also provided with adjustment means RC for changing the channel of the injected signal at the RJ terminal. The RJ terminal is also connected directly to the CPT terminals through a twisted pair.

The CPT terminals of boxes B1 to B4 are connected to the corresponding terminals R1 to R4 using a twisted pairs cable PT. Thus, the different boxes B1 to B4 are connected to the network consisting of prewired or previously installed twisted pairs. Note that the control signal received by the receiver RIR is connected to a terminal of the CPT that is connected to the service network. The balun BL is connected to the distribution network PD, while the modulator and the direct line originating from the RJ terminal are connected to the service network PS.

Furthermore, each receiver TV1 to TV4 is connected to its corresponding box B1 to B4 using a coaxial cable CX that is connected at the terminal F.

The room P1 is also equipped with a VCR MGT that is connected to the receiver TV1 using a SCART cable. The VCR MGT is also connected to the box B1 at the RJ connector using a SCART-RJ45 connection cable.

The room P2 is equipped with a DVD player connected to the receiver TV2 using a SCART cable. The DVD player is also connected to the box B2 using a SCART-RJ45 connection cable.

The room P3 is equipped with a camera C that is connected to the box B3 at the RJ terminal with a connection cable consisting of twisted wire pairs.

Room P4 only contains the receiver TV4 and the box B4.

Although this application mode uses three internal audio/video signal sources, it is obviously possible to provide more sources, for which the number is limited only by available space on the frequency plan. Source channels may be adjusted using adjustment means associated with the modulator MDL.

Preferably, remote controls TC1 to TC4 are universal remote controls capable of controlling receivers TV1 to TV4 and the VCR, the DVD player and the camera C.

Thus, receivers TV1 to TV4 and the VCR, the DVD player and the camera C are connected through boxes B1 to B4 respectively and connection cables PT are connected to terminals R1 to R4 in the network of cables consisting of twisted wire pairs PT that in this case is divided into a service sub-network PS and a distribution sub-network PD. This previously installed network runs outside rooms P1 to P4 and goes to an equipment room (not shown). In this equipment room, the different cables in the network originating from rooms P1 to P4 are connected to a multidistribution system using a connection cable. This MDS unit integrates multiplexing means MX that form network nodes that interconnect all cables PS in the existing service network.

This central remote distribution unit MDS includes multiplexing means MX and also several signal processing levels that firstly process up signals output from the service network and secondly down signals coming from the central remote distribution unit, and reinjected onto the distribution network. A complete architecture of this central remote distribution unit will be described below with reference to FIG. 4.

This is the architecture of the video signal transmission system according to the invention in this application case. The only video signal sources are internal sources, since they are composed of the VCR MGT, the DVD player and the camera C.

Obviously, a person in room P1 can start the VCR MGT using the remote control TC1 such that video signals will be transmitted to the receiver TV1 through the cable P. Similarly, a person in room P2 can operate the DVD player using the remote control TC2 so as to send video signals to the receiver TV2 through the cable P. This is quite conventional.

However with the invention, a person for example in room P4 can use the universal remote control TC4 to send a control signal, for example a read signal, to the receiver RIR of the box B4 to activate the VCR MGT located in room P1. After this control signal has been processed in the processing unit PIR, the processed control signal is sent to the connector CPT of the box 34. Starting from this point, the control signal is sent on the service network in the connection cable PT to connector R4 in the previously installed network. The control signal will then send it through the network on a specially dedicated pair called a "service pair", as far as the central unit MDS where it reaches specific multiplexing means mxs. The control signal is then multiplexed on all service pairs in the service network connecting the box MDS to terminals R1 to R4. When it reaches terminal R1, the signal returns through the connection cable PT as far as the box B1. After passing through the direct line to box B1, the control signal is sent as far as the VCR MGT through the connection cable PPT. The VCR MGT then receives a read control signal, and in response the VCR begins a read. The VCR thus outputs a video signal. Conventionally, this video signal is sent with a so-called "base band" signal of 12 MHz, which is not compatible with transmission on a cable consisting of twisted wire pairs. This is why the box B1 includes the modulator MDL, which has the function of modulating the base band video signal into a video signal that can be transmitted without losing any of the characteristics of the original signal. Once processed, the modulated video signal can be sent through the connection cable PT that connects the box B1 to the terminal R1. The modulated video signal then enters the twisted pairs service network PS and goes as far as the central unit MDS which contains multiplexing means MX. The modulated video signal is then processed in a video processing unit UT, and is then multiplexed with other inputs from the service network, and is then sent into another central processing unit U1 that performs processing on the signal approximately the inverse to that done by the unit UT. Starting from terminal R4, the video signal returns to box B4 at the balun BL, the function of which is to adapt the signal impedance so that in this case it can be transmitted through the coaxial cable CX connecting the box B4 to the receiver TV4. One main function of the balun BL is to transform the signal impedance from 75 to 100/120 Ohms. Thus, a person in room P4 can use his or her TV receiver T4 to display a cassette read by the VCR MGT located in room P1. Similarly, a person located in room P2 can use the VCR in room P1. Conversely, a person in room P1 can use the DVD player in room P2. All combinations are possible.

The spirit of this invention is to use a previously installed network of cables consisting of twisted wire pairs to route a control signal and modulated video signals on a service sub-network and processed multiplexed modulated signals on a distribution sub-network.

Refer now to FIG. 3 that illustrates a variant application also involving external sources of audio/video signals. It is worth noting immediately that the diagram in FIG. 3 includes the entire diagram shown in FIG. 1. Consequently, the structure and operation of this part will not be described any further. Only the differences from FIG. 1 will be described and commented on.

The central multi-distribution unit MDS' in FIG. 3 also comprises a processing stage UT composed of several individual processing units ut used for processing of signals passing through the service network. Since the service network is also used for returning control signals, the central unit MDS' also comprises multiplexing means mxs for the control signals. Since the control signals do not need any specific processing, they are simply multiplexed at the multiplexing stage mxs and reinjected directly into the service network PS to pass through the entire service network, and more particularly as far as the source concerned that will recognise the control signal. Once beyond the processing unit stage UT, treated up signals will be injected into the multiplexing means MX. In FIG. 4, it can be seen that the four lines in the previously installed network of twisted pairs that connect the four rooms P1 to P4 use four individual processing units ut. The other two remaining individual processing units, namely the two at the left in FIG. 4, receive signals output from an external source composed of mobile satellite terminals TS1 and TS2 that can be seen on FIG. 3. The parabolic dish PRB visible in FIG. 3 is connected to the central multi-distribution unit MDS' that will reinject the video signal received by the antenna PRB as far as the satellite terminals TS1 and TS2. This can be seen on FIG. 4 on which it is obvious that the antenna connected to unit MDS' is directly oriented along the service lines that are connected to the two satellite terminals TS1 and TS2. Signals processed in the satellite terminals TS1 and TS2 are then routed through the service line as far as the individual processing units ut that then send processed signals to the multiplexing means MX. The previously processed and modulated set of signals is sent from these multiplexing means to the processing unit U1 which performs approximately the inverse function to the function of the processing stage UT. The processing unit amplifies the signals, applies a preliminary slope, makes them symmetric and matches their impedance such that they can be reinjected onto the distribution network RD without significant loss of transmission characteristics.

The conventional rake antenna is directly connected to the processing unit U1, particularly with the multiplexed signals. The antenna signal ANT will be processed simply (amplified, preliminary slope applied, made symmetric, with matched impedance, etc.) so that it can be routed without any loss of transmission characteristics on the distribution network. The signal will be processed again at the output from the balun BL, so that it can be routed on a coaxial cable connected to the receiver.

Thus, a bouquet of signals each corresponding to a predetermined channel is injected at the input to U1. The number of channels is not limited except by the frequency plan.

It is quite clear that with this application, external sources are processed in the same way as internal sources using the two sub-networks (service and distribution) that are actually composed of the previously installed twisted pairs network.

This invention can thus be materialised as a set of boxes B1 to B4 and a box MDS or MDS'. Each box is connected to a terminal in the previously installed twisted wires network, and the dedicated TV or audio receiver and the internal video or audio source, if any, are connected to each box. The box MDS or MDS' is connected to all cables in the previously installed network, and incorporates processing and multiplexing units to reinject processed signals onto the distribution network to be sent to dedicated receivers.

The invention claimed is:

1. System for distribution of audio/video signals, comprising:
    audio or video signal sources;
    audio or video signal receivers;
    a central processing and multiplexing unit; and
    a twisted pairs network comprising two pairs of twisted wires;
    wherein one pair of the twisted pairs network is a service pair that routes source signals and control signals to the central processing and multiplexing unit;
    wherein a different pair of the twisted pairs network is a distribution pair that routes multiplexed processed signals from the central processing and multiplexing unit to the receivers;
    wherein the service pair carries up signals, the up signals being the sources signals derived from the sources and the control signals;
    wherein the distribution pair carries down signals, the down signals being the multiplexed processed signals;
    the up signals and the down signals are carried separately by the service pair and the distribution pair, respectively; and
    each of the source signals is a video signal.

2. System according to claim 1, also including means (RIR) of inputting the control signals that can be routed on the service network.

3. System according to claim 1, also including connection means (RJ) on which the signal sources can be connected to send the signals and to receive the control signals on the service network.

4. System according to claim 1, also including input modulators (MDL) associated with corresponding connection means (RJ) to modulate the source signals to be routed on the service network.

5. System according to claim 1, also including coaxial cable terminals (F) on which a coaxial cable (CX) leading to a TV receiver (TV1, TV2, TV3, TV4) can be connected.

6. System according to claim 1, also including adapters (BL) associated with coaxial terminals (F) to adapt a processed signal output from the distribution network to be routed on a coaxial cable.

7. System according to claim 1, also including multiplexing means (MX, mxs) to multiplex the control signals on the service network and to multiplex the modulated TV signals on the distribution network.

8. System according to claim 1, also including a processing unit (U1) to process the multiplexed modulated signals output from the service network so as to route them on the distribution network.

9. System according to claim 1, also including processing means (ut) for individually processing the modulated signals output from the service network before routing them to multiplexing means (MX).

10. System according to claim 7, in which the multiplexing means (mxs) multiplex the control signals output from the service network to reinject them onto the service network.

11. System according to claim 1, in which the control signal input means include a wave receiver (RIR) associated with a remote control (TC1, TC2, TC3, TC4).

12. System according to claim 1, including a box integrating:
    a—the input modulators (MDL) associated with corresponding connection means (RJ) to modulate signals output from sources,
    b—output adapters (BL) associated with corresponding coaxial terminals (F) to adapt the signal output from the distribution network,
    c—means (RIR) of inputting control signals that can be routed on the service network,
    d—connection means (RJ) onto which signal sources can be connected to send video signals and to receive control signals on the service network,
    e—coaxial cable terminals (F) to which a coaxial cable (CX) connecting to a TV receiver can be connected, and
    f—means (CPT) of connection to the distribution network and the service network.

13. System according to claim 1, in which the distribution network and the service network are formed from a single previously installed network of cables consisting of twisted wire pairs (PT).

14. System according to claim 1, in which the multiplexing means (MX, mxs) are also connected to external video signal sources (ANT, PRB, TS1, TS2) processed later in the processing unit (U1) so that they can be transferred onto the distribution network.

15. System according to claim 14, in which the external sources include antennas (ANT, PRB) and/or satellite terminals (TS1, TS2).

16. System according to claim 1, wherein the service pair and the distribution pair carry both audio and video type signals.

17. System according to claim 1, wherein each signal source and each signal receiver are connected to the central processing and multiplexing unit via the twisted pairs network comprising the two pairs of twisted wires.

18. System according to claim 17, wherein the twisted pairs network comprises only of the two pairs of twisted wires.

19. System according to claim 1, wherein each signal source and each signal receiver are directly connected to the central processing and multiplexing unit via the twisted pairs network comprising the two pairs of twisted wires.

20. System according to claim 1, wherein the service pair carries the control signals input from a control signal input means corresponding to a signal receiver to a signal source through the central processing and multiplexing unit, and carries a source signal from a signal source to the central processing and multiplexing unit; and
    the distribution pair carries the multiplexed processed signal, the multiplexed processed signal derived from the received source signal in the central processing and multiplexing unit, from the central processing and multiplexing unit to the corresponding signal receiver.

21. System according to claim 20, further including input modulators which modulate the source signals output in a base band frequency from the signal sources to modulated source signals compatible with transmission on the service pair and distribution pair; and the service pair carries the modulated source signal from the signal source to the central processing and multiplexing unit.

22. System according to claim 4, wherein the input modulators modulate the source signals output in a base band frequency from the signal sources to modulated source signals compatible with transmission on the service pair and distribution pair.

23. System according to claim 11, wherein the control signal input means corresponds to a receiver which is designated for receiving the processed signals from the central processing and multiplexing unit.

24. System according to claim 1, wherein the up signals and the down signals are not carried by a same pair of twisted wires of the service pair and the distribution pair.

25. System according to claim 1, wherein the service pair does not carry the down signals and the distribution pair does not carry the up signals.

* * * * *